(No Model.) 2 Sheets—Sheet 1.

DE WITT B. BRACE.
DYNAMO ELECTRIC MACHINE.

No. 421,479. Patented Feb. 18, 1890.

Witnesses:
William Bassett
Albert P. Worthen

Inventor:
De Witt B. Brace (No Model.) 2 Sheets—Sheet 2.

DE WITT B. BRACE.
DYNAMO ELECTRIC MACHINE.

No. 421,479. Patented Feb. 18, 1890.

Witnesses:
William Barrett
Albert P. Worcester

Inventor:
DeWitt B. Brace

UNITED STATES PATENT OFFICE.

DE WITT B. BRACE, OF LINCOLN, NEBRASKA.

DYNAMO-ELECTRIC MACHINE.

SPECIFICATION forming part of Letters Patent No. 421,479, dated February 18, 1890.

Application filed August 27, 1889. Serial No. 322,084. (No model.)

*To all whom it may concern:*

Be it known that I, DE WITT B. BRACE, a citizen of the United States, residing at Lincoln, in the county of Lancaster and State of Nebraska, have invented a new and useful Dynamo-Electric and Electro-Dynamic Machine, of which the following is a specification.

The object of my invention is to obviate the necessity of rotating either the field-magnets or armature proper, and also of thus obviating in certain classes of machines both commutators and brushes.

Heretofore the necessary induction in the armature has been generally effected by a relative motion of the armature with reference to fixed field-magnets or a rotation of the field-magnets with reference to a fixed armature. Either method causes an alternation in direction of the lines of force within and relative to the armature-coils. This method involves the maintenance of an invariable magnetic circuit within which the lines of force pass and the inclosure of this circuit in alternate directions by the relative rotation of the electric circuit in which the induced electro-motive is set off.

The method adopted in the present invention is the maintenance of a magnetic circuit which is not invariable throughout its whole extent, but which is made to pass successively through different branches into which the main circuit divides by making and breaking these branches by interposing magnetizable masses alternately in these branches, which branches are inclosed by the armature-coils, the other portion of the fixed circuit forming the field-magnets. In other words, the induced electro-motive force is produced in the armature-coils by alternately switching through them the whole or a part of the main magnetic circuit or circuits. It is thus seen that the direction of the lines of force within these coils is not changed, but only their number or the intensity of the field within the coils.

The following explanation of the diagrams will illustrate the mechanism for interposing the magnetizable masses and switching the magnetic circuit in certain forms of the machine.

Figure 1:
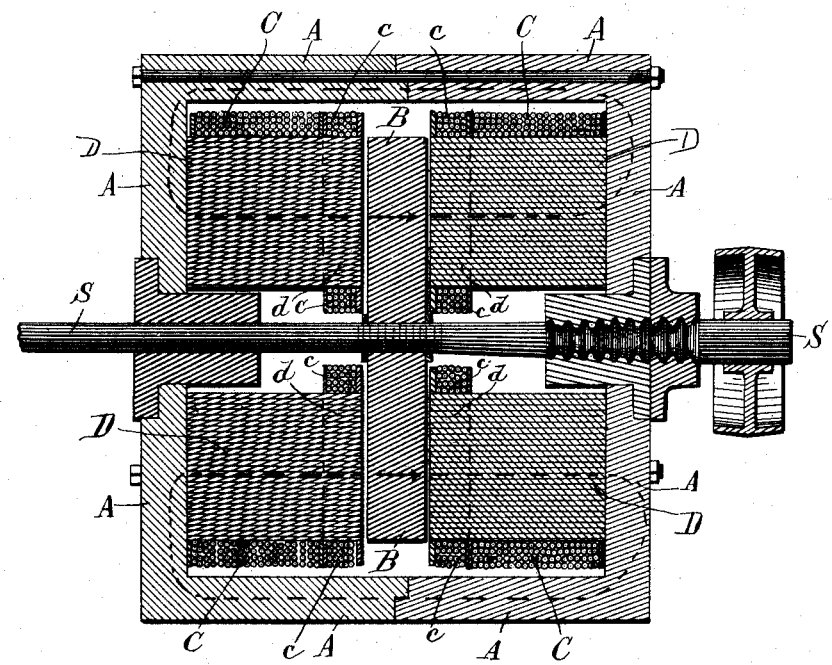
Figure 2:
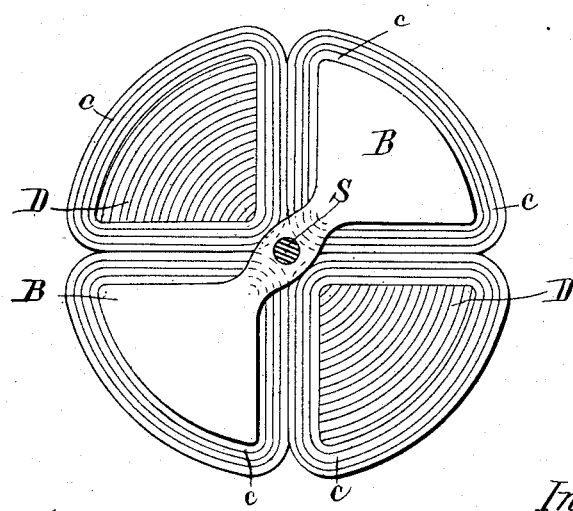

Figures 1 and 2 are vertical sections in and at right angles to the axis of one form of the machine, in which the armature and field coils, with cores and rotating iron masses, are inclosed by a shell A A. B B are the rotating laminated iron masses carried by the shaft *s s*. C C are the magnetizing-coils of the cores D D; and *c c* are the armature-coils, and *d d* their laminated cores. The dotted lines indicate the direction of the lines of force.

Figure 3:
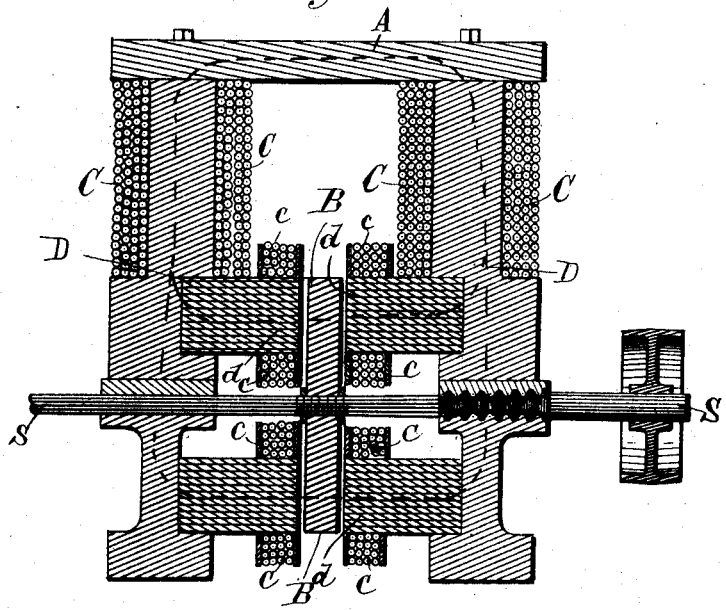
Figure 4:
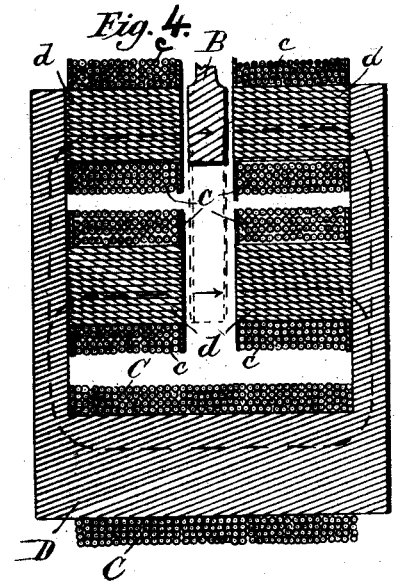

Fig. 3 is a vertical section of another form of machine, differing mainly in the form of the main magnetic circuit A A D D. Fig. 4 represents another form, in which the switching of the magnetic circuit through successive branches is attained by direct movement backward and forward of the iron mass between the several branches of the main circuit C C A A.

It is evident that when the mass B B is in line with *d d* a maximum number of lines of force will pass through the coils covered by it and a minimum number through those not covered. On moving the mass so as to cover the next set, lines of force will be created in them and destroyed in those which were covered before. There will thus be produced within each coil alternate maximum and minimum intensities of magnetic force, which will induce in the electric circuit an electro-motive force and corresponding current in alternate directions successively. The number of these branches in the main circuit or circuits are arbitrary, but in general must consist of two at least.

It is evident that the field-magnet may be excited in any way desired. It is further evident that this principle is applicable to either the production of an electric current by the application of mechanical energy or the production of mechanical energy by the passage through the machine of an electric current, so that under proper conditions it may serve as a dynamo-electric machine or as an electro-dynamic machine, as the case may be. To obtain the best effect, the space between the moving iron mass and the masses forming the branches of the magnetic circuit should be as narrow as possible. The number of iron masses interposed in a branch need not be limited to one, but may be more; nor is the limitation as to form or number of branches and main circuit restricted to those described.

Any form or number of moving iron masses, branches, and main circuit may be used so long as the application of the principle of the invention is adopted—namely, a mechanism for switching a magnetic circuit or circuits by means of successive interpositions of magnetizable masses between and in continuation of the branches or branch and main circuit.

What I claim as my invention, and desire to secure by Letters Patent, is—

1. The combination, with fixed field-magnets having two or more opposing pairs of fixed polar projections wound, one or more, with armature-coils, of magnetizable masses moving in a plane perpendicular to magnetic force between the opposing poles, and successively closing the magnetic circuit between successive pairs of poles.

2. The combination, with fixed field-magnets wound with magnetizing-coils having two or more opposing pairs of fixed laminated polar projections wound, one or more, with armature-coils, of laminated magnetizable masses moving in a plane perpendicular to the magnetic force between the opposing laminated poles and successively closing the magnetic circuit between successive pairs of poles.

DE WITT B. BRACE.

Witnesses:
WILLIAM BASSETT,
ALBERT P. NORTHEN.